No. 812,522. PATENTED FEB. 13, 1906.
J. E. PITTMAN.
TRAP.
APPLICATION FILED FEB. 16, 1905. RENEWED DEC. 26, 1905.
2 SHEETS—SHEET 2.
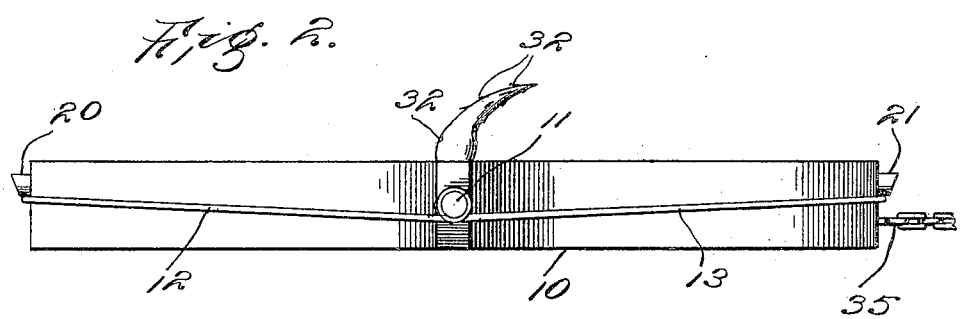
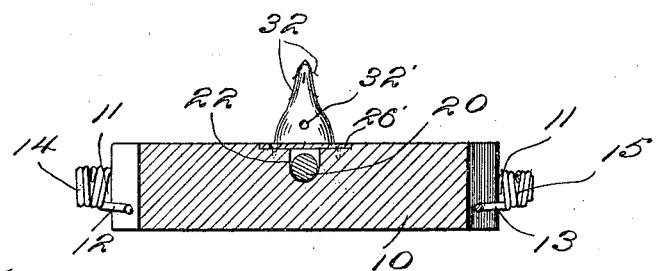
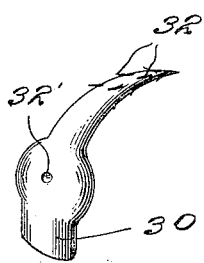

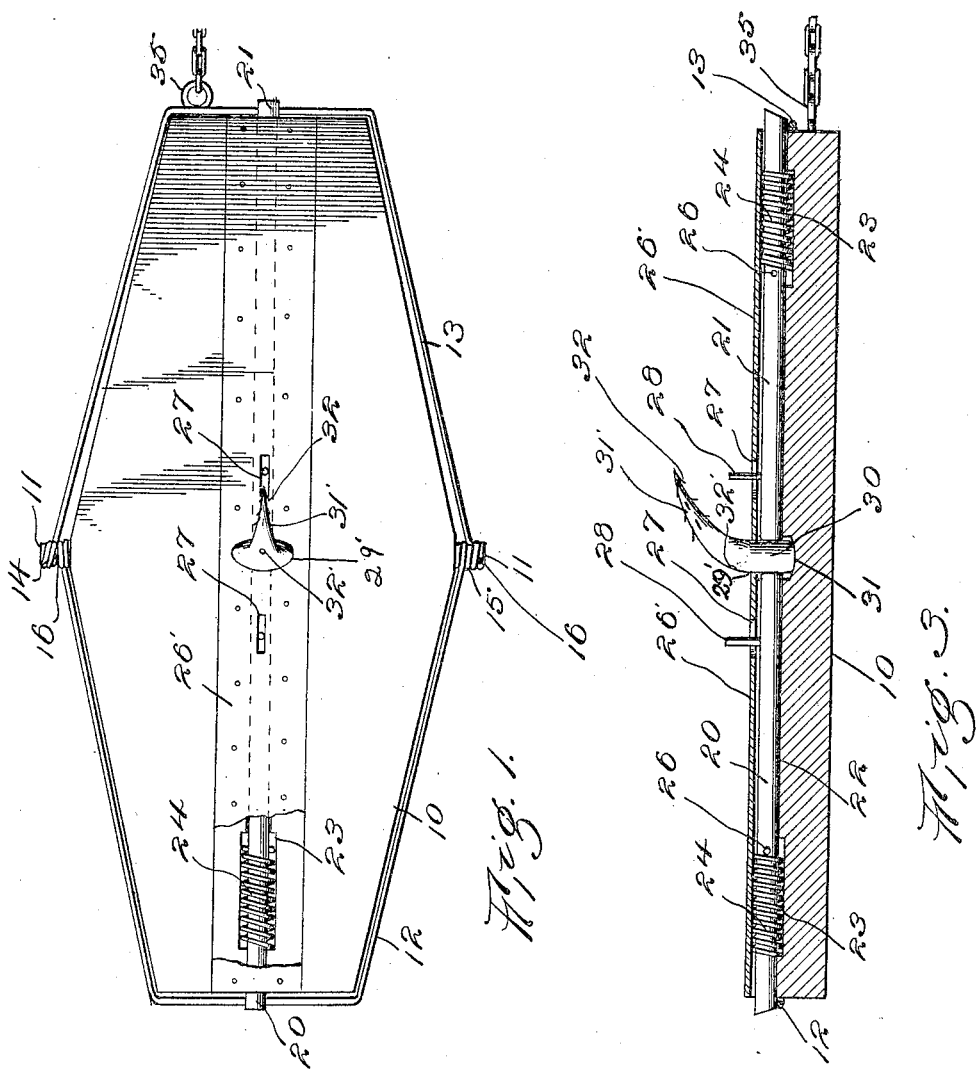

UNITED STATES PATENT OFFICE.

JAMES E. PITTMAN, OF GOLDHILL, COLORADO.

TRAP.

No. 812,522.  Specification of Letters Patent.  Patented Feb. 13, 1906.

Application filed February 16, 1905. Renewed December 26, 1905. Serial No. 293,330.

*To all whom it may concern:*

Be it known that I, JAMES E. PITTMAN, a citizen of the United States, residing at Goldhill, in the county of Boulder, State of Colorado, have invented certain new and useful Improvements in Traps; and I do hereby declare the following to be a full, clear, and exact description of the invention, such as will enable others skilled in the art to which it appertains to make and use the same.

This invention relates to animal-traps, and more particularly to that class comprising jaws which when the trap is sprung grip and hold the animal that springs the trap.

The object of the invention is to provide a construction which will be cheap and simple in the manufacture, which will catch and kill the animal that springs the trap, and in which, furthermore, the springing of the trap will be assured when the bait is taken.

In the drawings forming a portion of this specification, and in which like numerals of reference indicate similar parts in the several views, Figure 1 is a top plan view of the trap, partly in section. Fig. 2 is a side elevation. Fig. 3 is a vertical longitudinal section. Fig. 4 is a transverse section taken vertically through the trap. Fig. 5 is a detail view of the trigger.

Referring now to the drawings, there is shown a trap comprising a base 10, of heavy wood or similar material, which is tapered from the central portion in the direction of both ends, and secured to this base and projecting laterally therefrom at opposite sides of its broadest portion are trunnions 11. U-shaped spring-jaws 12 and 13 are provided, the ends of which are bent into helical form, as shown at 14 and 15, respectively, about the free end portion of the corresponding trunnions. The free end portion of each helix is passed through a perforation 16 in the corresponding trunnion, and the helices are so wound that when the jaws are moved from erect positions outwardly or away from each other said helices are placed under increased tension, there being normally sufficient tension to hold the jaws in tight clamping relation.

To set the trap, the jaws are swung apart and downwardly into a common horizontal plane with the base 10, and one of the jaws is slightly longer than the other, so that the jaws cannot pass each other. To hold the jaws in set positions, latch-bolts are provided and consist of the bars 20 and 21, which are slidably mounted in a channel 22, formed longitudinally of the upper face of the base 10. Adjacent to each end the channel is enlarged, as shown at 23, and in these enlarged portions are disposed helical springs 24. Through each spring is passed a bolt-bar 20, through which is engaged a transverse pin 26, against which the inner end of the corresponding spring rests, the outer end of the spring resting against the outer end of the corresponding enlarged portion of the channel. These springs serve to hold the bolt-bars yieldably at the inner ends of their movement. The channel is covered by plate 26, and in this plate are formed slots 27, in which slide handles 28, that are engaged in the bolt-bars, respectively, and which may be grasped to force the bars outwardly, so that their outer ends will project from the ends of the base to lie above the corresponding jaws and prevent upward movement thereof under the influence of the terminal helices. The outer ends of the bolt-bars are beveled at their under sides, and these bevels lie normally beyond the jaws when the trap is set. A slight retraction of the bolt-bars brings the beveled portions above the jaws, so that the latter move into contact with them and by pressing upwardly thereagainst aid in retracting the bars further.

In the middle portion of the plate 26' is an opening 29, which permits of insertion of the trigger between the inner ends of the bolt-bars to hold the bars projected. The trigger comprises an ellipsoidal body portion, from which depends a stem 30, that engages a socket 31 in the base, and from the upper end of the body portion there extends upwardly and laterally in curved shape an arm 31, having barbs 32 thereon. This arm or spear is passed through the bait, which may be further fastened in place by a cord passed through a perforation 32 in the body portion. The curved arm or spear holds the bait close to the base, and the animal in taking the bait must raise it so that the arm is lifted and the body is drawn upwardly from between the inner ends of the bolt-bars, which are then pressed toward each other by their helical springs to release the jaws. When the jaws are released, they move upwardly and toward each other with a pivotal movement, and they grab and hold the animal securely.

The base is provided with a ring 35 to receive a chain or other means for securely anchoring the trap, and it will be noted that the trap may be as readily sprung when lying upon its side as when in upright position.

It will be understood that in practice modifications of the specific construction shown may be made and any suitable materials and proportions may be used for the various parts without departing from the spirit of the invention.

What is claimed is—

1. A trap comprising a base, spring-actuated coöperating jaws carried by the base, a pair of bolt-bars slidably mounted in the base and movable into and out of position to engage the jaws when the latter are separated, means for holding the bolt-bars normally inactive and a trigger removably disposed between the ends of the bolt-bars and adapted to hold them in active positions.

2. A trap comprising a base having laterally-directed trunnions, jaws having terminal spring portions connected to the trunnions and adapted to stand yieldably in gripping relation, bolt-bars slidably mounted in the base in position to engage and hold the jaws in inactive relation, means for holding the bolt-bars yieldably in inactive positions, and a removable trigger disposed between the ends of the bolt-bars and adapted to hold them in inactive positions, such trigger being adapted for attachment of bait thereto.

In testimony whereof I affix my signature in presence of two witnesses.

JAMES E. PITTMAN.

Witnesses:
 JOHN KIRKBRIDE,
 JAS. H. GUISE.